Patented Mar. 5, 1935

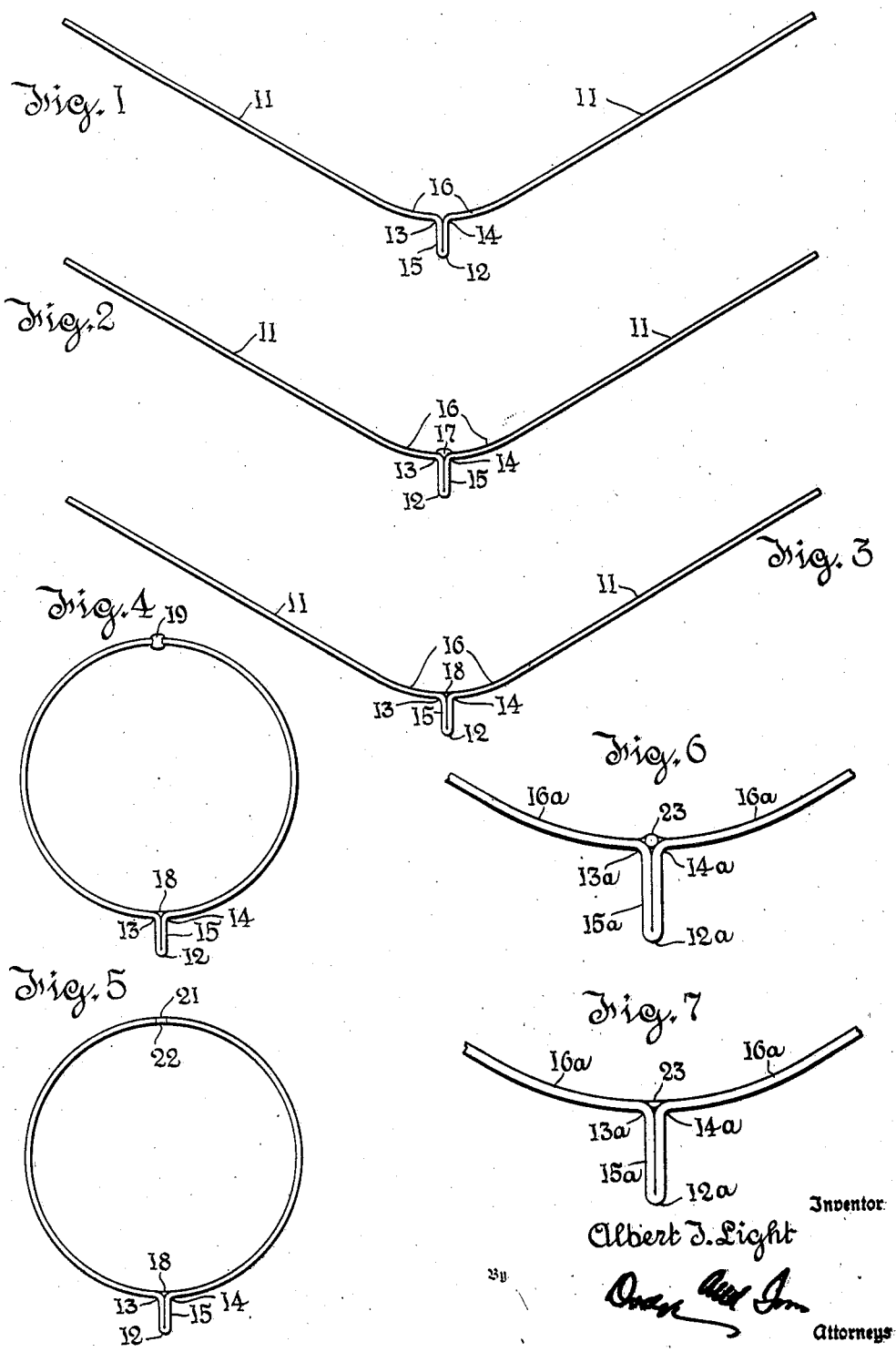

1,993,066

UNITED STATES PATENT OFFICE 1,993,066

METHOD OF MAKING ONE-PIECE RIBBED TUBING

Albert T. Light, York, Pa., assignor to York Ice Machinery Corporation, York, Pa., a corporation of Delaware Application May 8, 1934, Serial No. 724,627

5 Claims. (Cl. 29—157.3)

This invention relates to the production of tubing having a longitudinal rib, and is directed to a method in which the rib is formed from the metal of a sheet metal tube blank.

The purpose of the invention is to produce tubing particularly adapted for use in dairy apparatus, such as milk coolers, in which the highest degree of surface finish is required. Attempts to weld ribs to preformed tubes have not proved successful, for the reason that the tube is permanently warped by the high temperatures necessarily used in the welding operation. The use of solders to attach ribs to tubes is not satisfactory, for the reason that the solder tends to crack, particularly where sudden changes of temperature are encountered, and these cracks are so small that they can not be kept clean, and therefore become breeding centers for bacteria.

I have discovered that if the rib be welded in a sheet metal blank, and particularly if the blank be curved to final form adjacent the weld prior to the welding operation, it is possible to curve the blank to finished tubular form and weld the same without serious difficulty.

In a companion application I describe and claim a method of producing tubes in which the tubing and the rib are formed from separate blanks. The present invention is directed to similar inventive concepts in which the rib is formed from the tube blank itself.

Preferred embodiments of the invention will now be described in connection with the accompanying drawing, in which,—

Fig. 1 is an end view of a tube blank folded to form a rib and curved on opposite sides of said rib to its final contour.

Fig. 2 is a similar view showing the blank after the welding operation.

Fig. 3 is a similar view showing the blank after the weld has been finished flush with the surface of the blank.

Fig. 4 is an end view of the tube after the blank has been curved to final form and seam welded.

Fig. 5 is a similar end view of the tube after the weld has been finished flush both inside and outside the tube.

Fig. 6 is a view similar to Fig. 2 showing a slight modification.

Fig. 7 is a view similar to Fig. 3 showing such modified construction in the state of Fig. 3.

Referring first to Fig. 1, a long sheet metal blank 11 is folded upon itself at 12 and then outward at 13 and 14 to afford an integral rib 15. On each side of the rib, as indicated at 16, the blank is curved, the radius of curvature being substantially that of the finished tube.

The next step in the production of the tube is the welding of the two plies which form the rib 15 together. This weld is adjacent the folds 13 and 14, and is indicated at 17.

After the weld is formed it is ground flush with the surface of the blank, as indicated at 18 in Fig. 3.

The next step in the operation is to curve the tube blank 11 to finished form and weld its edges together as indicated in Fig. 4, the weld between the edges being indicated at 19.

After the weld is completed it is ground and polished so that it is flush with the internal and external contour of the tube, as indicated at 21 and 22, in Fig. 5.

In case it is desired to reduce the amount of metal deposited to form the weld, it is possible to resort to the construction indicated in Figs. 6 and 7, in which parts similar to those shown in Figs. 1 to 5, are indicated by similar reference numerals with the letter "a".

In the construction of Fig. 6, a filler strip or wire 23 is used partially to close the groove formed where the folds 13a and 14a meet. This has the effect of reducing the amount of metal deposited in the welding operation, and would permit some latitude in the formation and spacing of the metal plies forming the rib 15a. After the weld is completed it is finished flush with the interior of the tube blank, just as is indicated in Fig. 5 with reference to the first embodiment of the invention.

While the invention has been described in considerable detail for purposes of explanation, the description is intended to be explanatory and not limiting, and minor modifications within the scope of the invention are contemplated. The scope of the invention will be defined in the claims.

What is claimed is,—

1. The method of producing tubing having a longitudinal rib which comprises preparing a sheet metal blank; folding said blank reversely on three parallel lines to form a rib composed of two plies adjacent each other; welding said adjacent plies together; then curving said blank to tube form with its edges juxtaposed; and welding said juxtaposed edges together.

2. The method of producing tubing having a longitudinal rib which comprises preparing a sheet metal blank; folding said blank reversely on three parallel lines to form a rib composed of two plies adjacent each other; welding said adjacent plies together; finishing said weld flush with the adjacent surfaces of the blank; then curving said blank to tube form with its edges juxtaposed; welding said juxtaposed edges together; and finishing said weld inside and outside the tube flush with the inner and outer surfaces of the tube.

3. The method of producing tubing having a longitudinal rib which comprises preparing a sheet metal blank; folding said blank reversely on three parallel lines to form a rib composed of two plies adjacent each other; curving adjacent portions of the blank to their final curvature; then welding said adjacent plies together; curving the remainder of said blank to final form with its edges juxtaposed; and welding said edges together.

4. The method of producing tubing having a longitudinal rib which comprises preparing a sheet metal blank; folding said blank reversely on three parallel lines to form a rib composed of two plies adjacent each other; curving adjacent portions of the blank to their final curvature; then welding said adjacent plies together; finishing said weld flush with the adjacent surfaces of the blank; curving the remainder of said blank to final form with its edges juxtaposed; welding said edges together; and finishing said weld inside and outside the tube, flush with the inner and outer surfaces of the tube.

5. The steps in the method of producing tubing from a blank folded to form an integral rib which is to be welded, such steps comprising curving portions of the blank adjacent to and on opposite sides of the rib to final form; then welding the rib; thereafter forming the remainder of the blank to final form with its edges juxtaposed; and then welding said edges together.

ALBERT T. LIGHT.